United States Patent [19]

Chikamori et al.

[11] Patent Number: 5,081,974
[45] Date of Patent: Jan. 21, 1992

[54] FUEL CONTROL APPARATUS OF AN ENGINE

[75] Inventors: Takeshi Chikamori, Yamaguchi; Masaki Ohkubo, Hiroshima; Akira Kamisakamoto, Hiroshima; Shoji Imai, Hiroshima; Shunichi Tsubota, Hiroshima; Hideyuki Uemura, Hiroshima; Shinichi Wakutani, Hiroshima, all of Japan

[73] Assignee: Mazda Motor Corporation, Hiroshima, Japan

[21] Appl. No.: 644,576

[22] Filed: Jan. 23, 1991

[30] Foreign Application Priority Data

Jan. 25, 1990 [JP] Japan .................................. 2-15831

[51] Int. Cl.⁵ ............................................ F02D 41/04
[52] U.S. Cl. ................................. 123/478; 123/52 M
[58] Field of Search ............... 123/52 M, 478, 480, 123/492

[56] References Cited

U.S. PATENT DOCUMENTS

| | | | |
|---|---|---|---|
| 4,598,678 | 7/1986 | Kobayashi et al. | 123/478 X |
| 4,643,136 | 2/1987 | Ura et al. | 123/52 M |
| 4,658,792 | 4/1987 | Yamashita et al. | 123/478 |
| 4,725,954 | 2/1988 | Takao et al. | 123/492 X |
| 4,898,144 | 2/1990 | Kobayashi et al. | 123/52 M |
| 4,957,089 | 9/1990 | Morikawa | 123/478 X |
| 5,005,532 | 4/1991 | Shillington | 123/52 M |
| 5,025,380 | 6/1991 | Wataya et al. | 123/478 X |

*Primary Examiner*—Willis R. Wolfe
*Attorney, Agent, or Firm*—Sixbey, Friedman, Leedom & Ferguson

[57] ABSTRACT

A fuel control apparatus of an engine comprises fuel control means for controlling fuel supply means so that an amount of fuel supplied to the engine corresponds to an intake pressure on the basis of a signal outputted from intake pressure detecting means for detecting the intake pressure of an intake passageway, intake resistance changing means for changing a resistance of the intake air flowing through the intake passageway correspondingly to the operating condition of the engine, and correction means for correcting a supply amount of the fuel to be controlled by the fuel control means when the resistance of the intake air flowing through the intake passageway is changed by the intake resistance changing means.

12 Claims, 5 Drawing Sheets

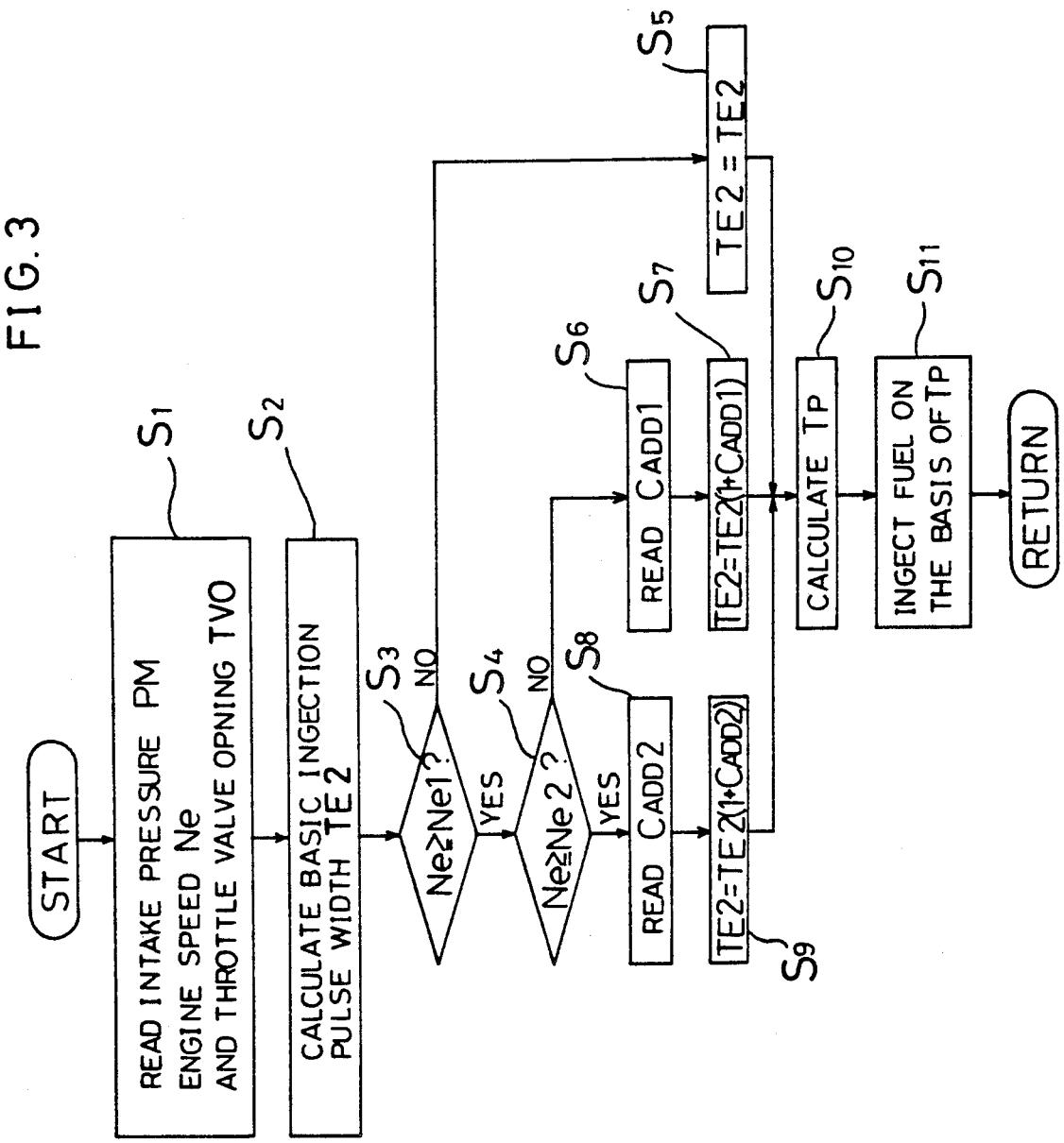

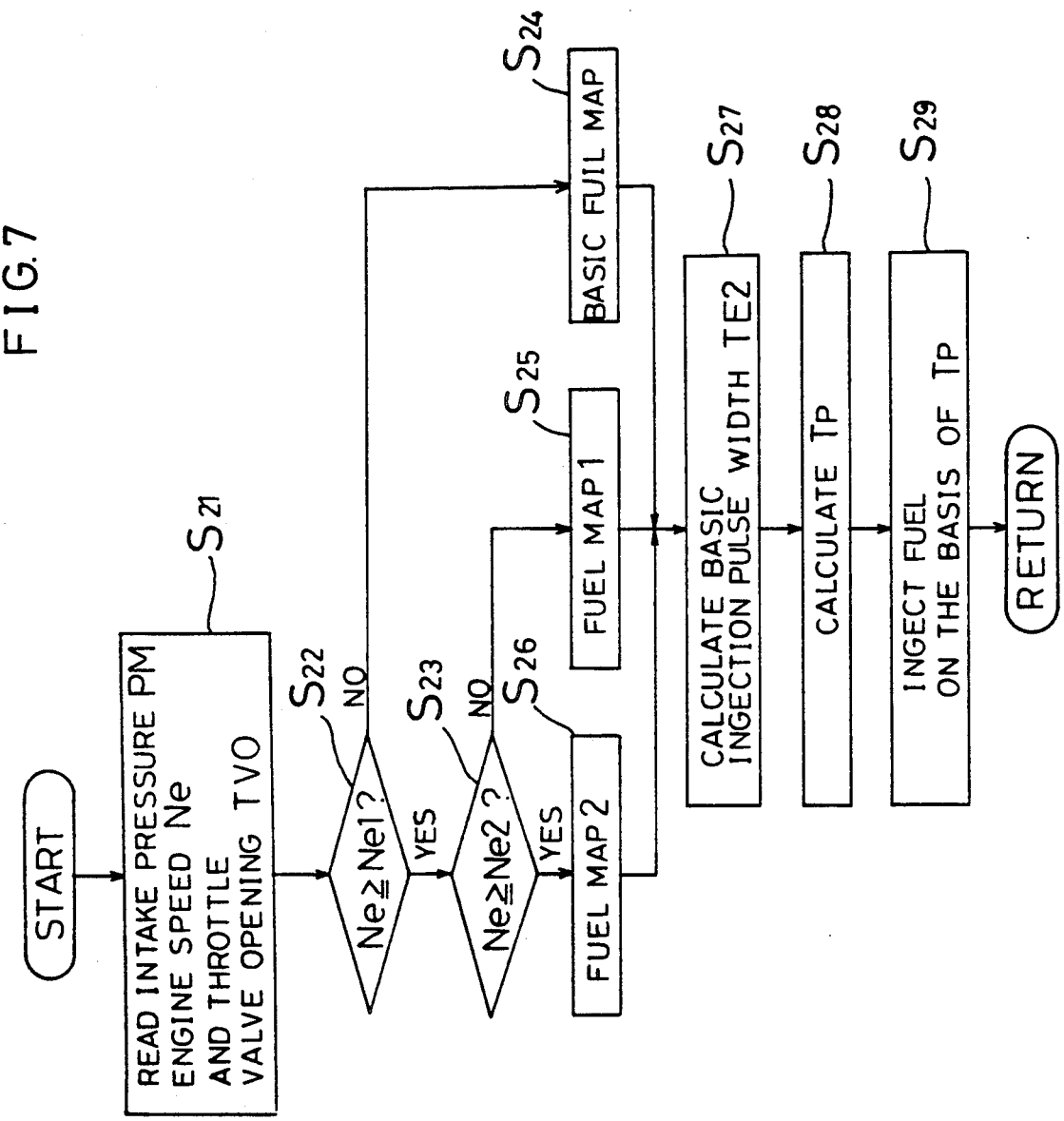

FUEL CONTROL APPARATUS OF AN ENGINE

BACKGROUND OF THE INVENTION

The present invention relates to a fuel control apparatus of an engine, and particularly to an apparatus for controlling an amount of fuel supplied to the engine correspondingly to an intake pressure.

Japanese Unexamined Patent Publication No. 59-15656 has disclosed a fuel control apparatus of an engine wherein a fuel injector is provided in an intake passageway, an intake pressure sensor for detecting the intake pressure is provided in the intake passageway on the downstream side of a throttle valve and an amount of the fuel supplied from the fuel injector is controlled on the basis of the intake pressure detected by the intake pressure sensor and the number of rotations of the engine.

In general, there is known a technique that the intake passageway of the engine is provided with means for changing a resistance of intake air flowing therethrough so that output characteristics of the engine can be improved. By way of example, there are known the following two intake resistance changing means.

According to the first intake resistance changing means, the engine has first and second branch passageways provided in parallel with each other in the intake passageway thereof. The second branch passageway has a control valve so as to change the area of the intake passageway depending on opening or closing thereof. When an engine speed is decreased, the control valve is closed so that the intake air is supplied through only the first branch passageway. Consequently, the intake air is easily flowed to promote combustion. On the other hand, when the engine speed is increased, the control valve is opened so that the intake air is supplied through both the first and second branch passageways. Consequently, the resistance of the intake air is reduced, so that the amount of the intake flow is increased. Thus, an output of the engine is increased.

According to the second intake resistance changing means, the engine has high and low speed intake passageways provided in parallel with each other in the intake passageway thereof. The low speed intake passageway has a greater equivalent tube length. The high speed intake passageway has a smaller equivalent tube length and provided with a control valve. The length of the intake passageway is changed depending on the opening or closing of the control valve. When the engine speed is decreased, the control valve is closed so that the intake air is supplied through only the low speed intake passageway. Consequently, there can be obtained an intake inertia effect corresponding to the length of the low speed intake passageway. On the other hand, when the engine speed is increased, the control valve is opened so that the intake air is supplied mainly through the high speed intake passageway. Consequently, there can be obtained the intake inertia effect corresponding to the length of the high speed intake passageway. Thus, the output is increased the whole rotating area of the engine.

However, in the cases where the above-mentioned intake resistance changing means are provided on the above mentioned apparatus for controlling an amount of fuel supplied to an engine correspondingly to the intake pressure, an air fuel ratio is changed when the intake resistance is changed along with the change in area or length of the intake passageway. For example, in the case where the engine speed is increased with acceleration, the resistance of the intake air flowing through the intake passageway is reduced if the area of the intake passageway is increased or the length of the intake passageway is reduced. Consequently, when the opening of the throttle valve is not changed, the intake flow is excessively increased. When the opening of the throttle valve is slightly reduced in order to make the intake flow proper, the intake pressure is reduced. As a result, the intake flow does not correspond to the intake pressure. Therefore, when a supply amount of the fuel is conventionally and uniformly controlled correspondingly to the intake pressure, the air fuel ratio is deviated from a desired value. Also in the case where the engine speed is decreased with deceleration, the air fuel ratio is deviated from the desired value.

SUMMARY OF THE INVENTION

To solve the above mentioned problems, it is an object of the present invention to control a supply amount of fuel correspondingly to an intake pressure and to prevent an actual air fuel ratio from being deviated from a desired one when a resistance of intake air flowing through an intake passageway is changed by intake resistance changing means.

To avoid the above mentioned drawbacks, a fuel control apparatus of an engine according to the present invention comprises fuel supply means for supplying fuel to the engine, intake pressure detecting means for detecting an intake pressure of an intake passageway through which intake air is fed into the engine, fuel control means for controlling the fuel supply means in such a manner that an amount of the fuel supplied to the engine corresponds to the intake pressure on the basis of a signal outputted from the intake pressure detecting means, intake resistance changing means for changing a resistance of the intake air flowing through the intake passageway correspondingly to the operating condition of the engine, and correction means for correcting a supply amount of the fuel to be controlled by the fuel control means when the resistance of the intake air flowing through the intake passageway is changed by the intake resistance changing means.

BRIEF DESCRIPTION OF THE DRAWINGS

FIG. 3 is a flow chart showing the contents of control of a control unit provided on the fuel control apparatus of an engine;

FIG. 7 is a flow chart showing a variant of the contents of control of the control unit.

DETAILED DESCRIPTION OF THE INVENTION

There will be described a preferred embodiment of the present invention with reference to the drawings.

Figure 1:
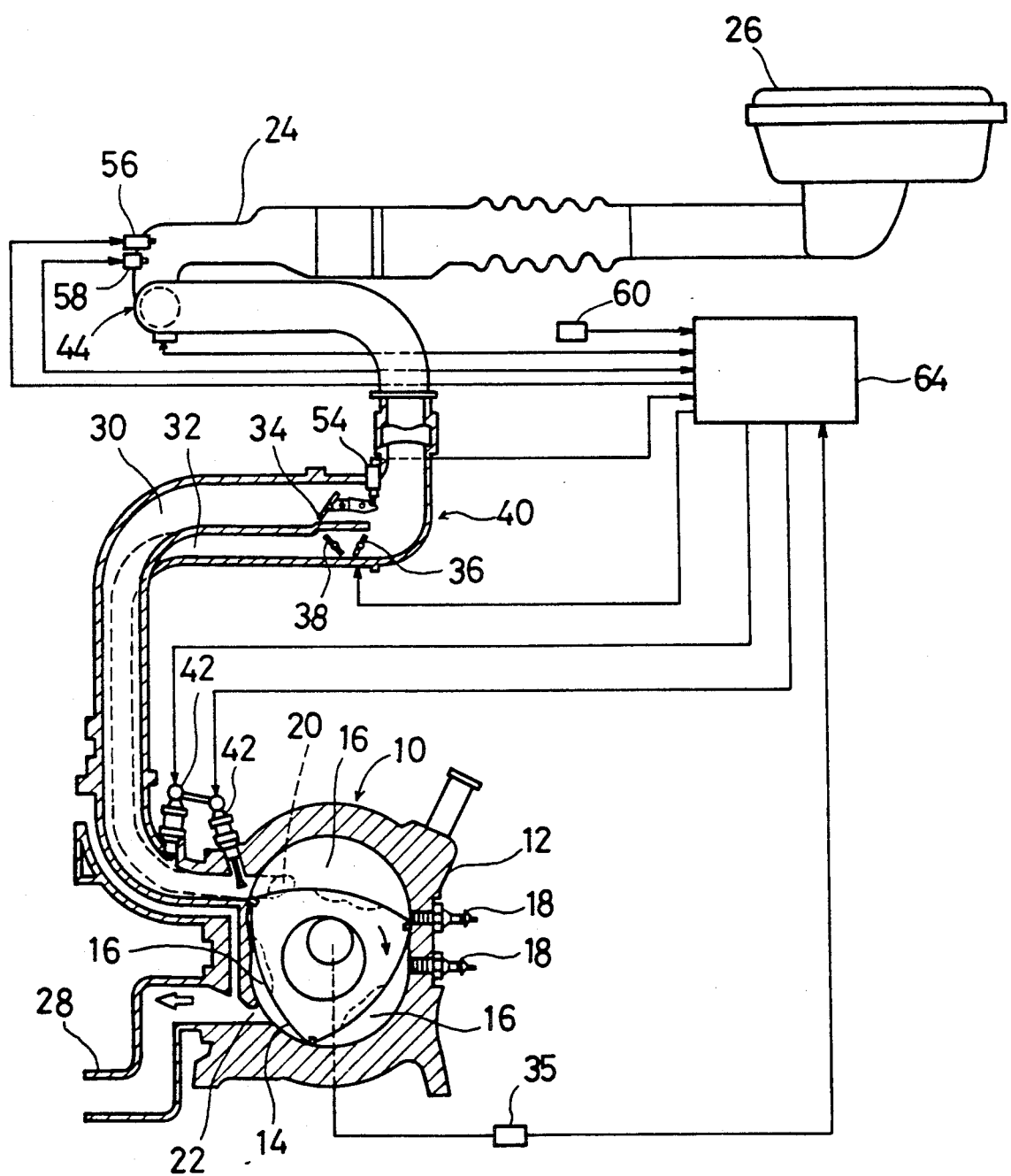
FIG. 1 is a section view of a fuel control apparatus of an engine according to the present invention and the engine to which the fuel control apparatus is applied.

FIG. 1 shows a rotary piston engine 10 of a fuel injection type including a fuel control apparatus according to an embodiment of the present invention. The rotary piston engine 10 includes a rotor housing 12 and a rotor 14. The rotor housing 12 has an inner peripheral surface which is trochoidal. The rotor 14 is provided in the rotor housing 12. The rotor housing 12 and the rotor 14 form three operation chambers 16, 16 and 16. Each step of inhalation, compression, explosion, expansion or exhaust is carried out along with the rotation of the rotor 14 in each operation chamber 16. The rotor housing 12 has two ignition plugs 18, 18, an intake port 20 and an exhaust port 22 respectively provided on a peripheral wall, a side wall and the peripheral wall thereof. The intake port 20 is communicated at the side wall thereof with the operation chamber 16 in which the inhalation is carried out. The exhaust port 22 is communicated at the peripheral wall thereof with the operation chamber 16 in which the exhaust is carried out.

The intake port 20 is connected to an intake passageway 24. The intake passageway 24 has one end thereof opened to the air through an air cleaner 26. The exhaust port 22 is connected to an exhaust passageway 28.

The intake passageway 24 branches out in the middle thereof into a main intake passageway 30 having a large diameter and a sub intake passageway 32 having a small diameter. The main intake passageway 30 has a main throttle valve 34. The sub intake passageway 32 has a sub throttle valve 36. When the opening of an accelerator pedal is increased, the main throttle valve 34 is opened. When a predetermined opening of the accelerator pedal is exceeded, the sub throttle valve 36 is opened. The sub intake passageway 32 has an auxiliary valve 38 provided on the downstream side of the sub throttle valve 36 therein. When the sub throttle valve 36 is opened, the auxiliary valve 38 is gradually opened in order to ease the sharp variation of intake air flow.

The main intake passageway 30, the sub intake passageway 32 and the sub throttle valve 36 form first intake resistance changing means 40. The first intake resistance changing means 40 changes the area of the intake passageway 24 correspondingly to operating condition of the engine 10. When the engine speed is decreased, the sub throttle valve 36 is closed so that the intake air is supplied to the engine 10 through only the main intake passageway 30. Consequently, a flow speed of the intake air is increased to promote combustion. On the other hand, when the engine speed is increased, the sub throttle valve 36 is opened so that the intake air is supplied to the engine 10 through both the main intake passageway 30 and the sub intake passageway 32. Consequently, the flow of the intake air is fully ensured so that the output of the engine is increased. Fuel injectors 42, 42 are provided in the vicinity of the intake port 20 in the main intake passageway 30 and the sub intake passageway 32. The fuel injectors 42, 42 serve as fuel supply means.

Figure 2:
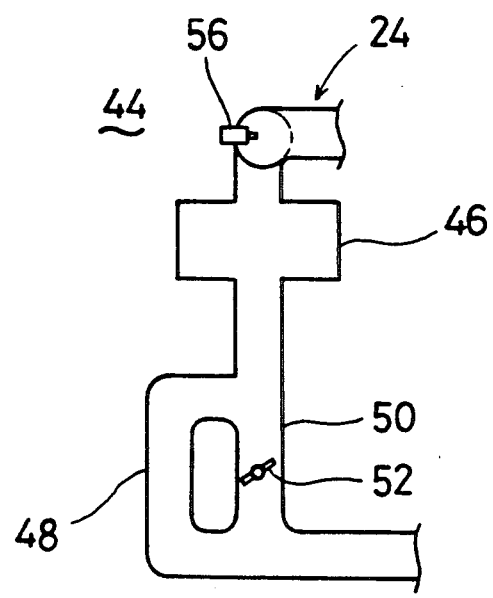
FIG. 2 is a plan view of second intake resistance changing means provided on the fuel control apparatus of an engine.

Provided on the upstream side of the first intake resistance changing means 40 in the intake passageway 24 is second intake resistance changing means 44 (which is shown in detail in FIG. 2). The second intake resistance changing means 44 changes the area of the intake passageway 24 correspondingly to the operating condition of the engine 10 and includes a surge tank 46, a low speed intake passageway 48, a high speed intake passageway 50 and a throttle valve 52. The intake passageway 24 branches out on the downstream side of the surge tank 46 into the low speed intake passageway 48 having a greater equivalent tube length and the high speed intake passageway 50 having a smaller equivalent tube length. The throttle valve 52 is provided in the high speed intake passageway 50. Referring to the second intake resistance changing means 44, when the engine speed is decreased, the throttle valve 52 is closed so that the intake air is supplied to the engine through only the low speed intake passageway 48. Consequently, there can be obtained an intake inertia effect corresponding to the length of the low speed intake passageway 48. On the other hand, when the engine speed is increased, the throttle valve 52 is opened so that the high speed intake passageway 50 is mainly operated. Consequently, there can be obtained the intake inertia effect corresponding to the length of the high speed intake passageway 50. Thus, the output is increased the whole rotating area of the engine.

In FIG. 1, indicated at 54 is a throttle sensor connected to the main throttle valve 34 for detecting the opening thereof, indicated at 56 is an intake pressure sensor as intake pressure detecting means provided in the intake passageway 24 for detecting the intake pressure thereof, indicated at 58 is an intake temperature sensor provided in the intake passageway 24 for detecting an intake temperature, indicated at 60 is an air pressure sensor for detecting an air pressure, and indicated at 62 is a crank angle sensor for detecting a crank angle. Further, indicated at 64 is a control unit having a CPU. The control unit 64 receives output signals from the throttle sensor 54, the intake pressure sensor 56, the intake temperature sensor 58, the air pressure sensor 60 and the crank angle sensor 62 so as to control the fuel injectors 42, 42, and the first and second intake resistance changing means 40 and 44, respectively.

There will be described the contents of control of the control unit 64 with reference to a flow chart of FIG. 3.

First, an intake pressure PM, the engine speed Ne and a throttle valve opening TVO are read at Step S1, and a basic injection pulse width TE2 is calculated at Step S2.

Figure 4:
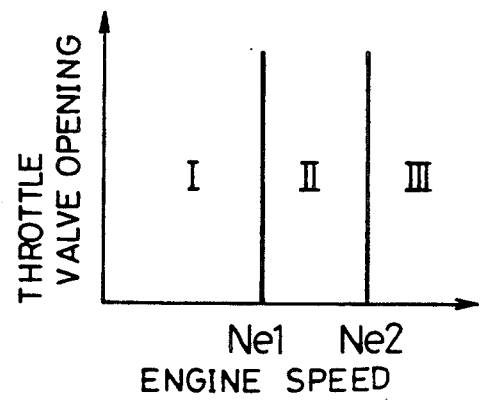
FIG. 4 is a view showing a control region determined in accordance with the number of rotations of the engine.

Then, it is decided whether the engine speed Ne is equal to or greater than the engine speed Ne1 shown in FIG. 4 at Step S3, and it is decided whether the engine speed Ne is equal to or greater than the engine speed Ne2 shown in FIG. 4 at Step S4. Ne1 is the engine speed at which the sub throttle valve 36 of the first intake resistance changing means 40 is opened. Ne2 is the engine speed at which the throttle valve 52 of the second intake resistance changing means 44 is opened. Ne1 is smaller than Ne2.

When it is decided that Ne is smaller than Ne1 in Step S3, the engine speed Ne is within a region I shown in FIG. 4. Consequently, the basic injection pulse width TE2 is not corrected in Step S5 and this routine proceeds to Step S10. At Step S10, a basic correction on the basis of a battery voltage or the like is added to the basic injection pulse width TE2 so as to obtain a final injection pulse width Tp. Then, fuel injection is carried out by the injectors 42, 42 on the basis of the final injection pulse width Tp at Step S11. Thereafter, this routine returns to Step S1.

Figure 5:
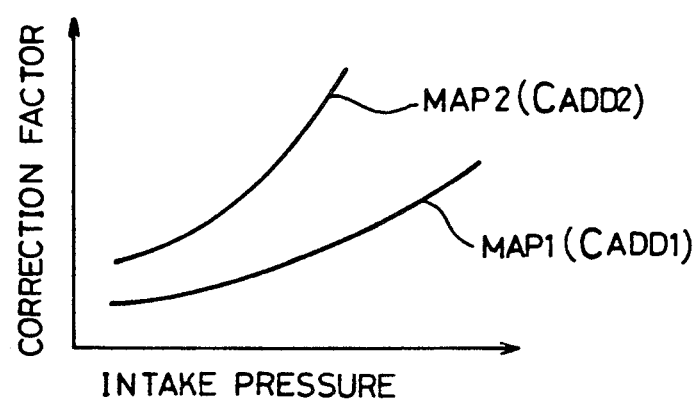
FIG. 5 is a view showing the relationship between an absolute value of an intake pressure and a correction factor.

When it is decided that Ne is equal to or greater than Ne1 in Step S3 and it is decided that Ne is smaller than Ne2 in Step S4, the engine speed Ne is within a region II shown in FIG. 4. Consequently, a correction factor C ADD 1 is read out of a map 1 of FIG. 5 at Step S6. According to the map 1, when an absolute value of the intake pressure is increased, the correction factor C ADD 1 is also increased. At Step S7, the basic injection pulse width TE2 is corrected with a formula, TE2=-TE2 (1+C ADD 1). Then, this routine proceeds to Step S10. At Step S10, the basic correction is added to the basic injection pulse width TE2 so as to obtain the final injection pulse width Tp. At Step S11, the fuel injection is carried out by the injectors 42, 42 on the basis of the final injection pulse width Tp. Then, this routine returns to Step S1.

When it is decided that Ne is equal to or greater than Ne1 in Step S3 and it is decided that Ne is equal to or greater than Ne2 in Step S4, the engine speed Ne is within a region III shown in FIG. 4. Consequently, a correction factor C ADD 2 is read out of a map 2 of FIG. 5 at Step S8. Also in the map 2, when the absolute value of the intake pressure is increased, the correction factor C ADD 2 is increased. At Step S9, the basic injection pulse width TE2 is corrected with a formula, TE2=TE2 (1+C ADD 2). Then, this routine proceeds to Step S10. At Step S10, the basic correction is added to the basic injection pulse width TE2 so as to obtain the final injection pulse width Tp. At Step S11, the fuel injection is carried out by the injectors 42, 42 on the basis of the final injection pulse width Tp. Then, this routine returns to Step S1.

In Steps S1, S2, S10 and S11, fuel control means is formed in order to receive an output from the intake pressure detecting means (intake pressure sensor) 56 and control the fuel supply means (injector) 42 so that the amount of the fuel supplied to the engine corresponds to the intake pressure. The injector 42 is controlled by the fuel control means on the basis of an intake pressure detected by the intake pressure sensor 56.

Figure 6:
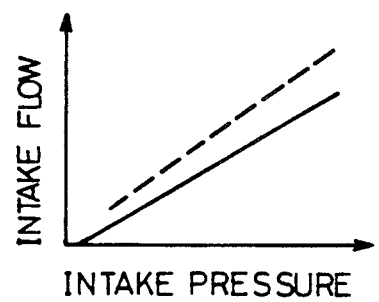
FIG. 6 is a view showing the relationship between the intake flow and the intake pressure.

In Steps S3 to S9, correction means is formed in order to correct the amount of the fuel supplied from the fuel supply means (injector) 42 correspondingly to the operation of the first and second intake resistance changing means 40 and 44. Accordingly, the first and second intake resistance changing means 40 and 44 change a resistance of the intake air flowing through the intake passageway 24 correspondingly to the operating condition of the engine 10. Consequently, the output characteristics of the engine 10 can be improved. In this case, the correction means is operated in such a manner that the amount of the fuel supplied from the injector 42 is increased when the absolute value of the intake pressure is increased. Consequently, in the case where the resistance of the intake air flowing through the intake passageway 24 is changed, the relationship between the intake flow and the intake pressure is corrected from a solid line to a broken line in FIG. 6 so that the intake flow corresponds to the intake pressure. Thus, an actual air fuel ratio can be prevented from being deviated from a desired one.

In the case where the resistance of the intake air flowing through the intake passageway 24 is changed by the first and second intake resistance changing means 40 and 44, the air fuel ratio can be prevented from being temporarily changed due to a control delay of the above mentioned injection pulse width or the like if the fuel injection is asynchronously carried out by the injector 42.

There will be described a variant of the above mentioned embodiment with reference to FIG. 7.

While the basic injection pulse width TE2 is corrected with the correction factor C ADD 1 or C ADD 2 so that the supply amount of the fuel is corrected in the above mentioned embodiment, an injection pulse width is obtained from a map in the variant to be described below.

At Step S21, an intake pressure PM, the engine speed Ne and a throttle valve opening TVO are read. At Step S22, it is decided whether the engine speed Ne is equal to or greater than the engine speed Ne1 shown in FIG. 4. At Step S23, it is decided whether the engine speed Ne is equal to or greater than the engine speed Ne2 shown in FIG. 4.

When it is decided that Ne is smaller than Ne1 in Step S22, the engine speed Ne is within a region I shown in FIG. 4. Consequently, a basic fuel map is selected at Step S24. At Step S27, a basic injection pulse width TE2 is calculated with reference to the above mentioned basic fuel map. At Step S28, the basic correction is added to the basic injection pulse width TE2 so as to obtain a final injection pulse width Tp. At Step S29, fuel injection is carried out by the injectors 42, 42 on the basis of the final injection pulse width Tp. Then, this routine returns to Step S21.

When it is decided that Ne is equal to or greater than Ne1 in Step S22 and it is decided that Ne is smaller than Ne2 in Step S23, the engine speed Ne is within a region II shown in FIG. 4. Consequently, a fuel map 1 is selected at Step S25. At Step S27, the basic injection pulse width TE2 is calculated with reference to the fuel map 1. At Step S28, the final injection pulse width Tp is obtained. At Step S29, the fuel injection is carried out by the injectors 42, 42 on the basis of the final injection pulse width Tp. Then, this routine returns to Step S21.

When it is decided that Ne is equal to or greater than Ne1 in Step S22 and it is decided that Ne is equal to or greater than Ne2 in Step S23, the engine speed Ne is within a region III shown in FIG. 4. Consequently, a fuel map 2 is selected at Step S26. At Step S27, the basic injection pulse width TE2 is calculated with reference to the fuel map 2. At Step S28, the final injection pulse width Tp is obtained. At Step S29, the fuel injection is carried out by the injectors 42, 42 on the basis of the final injection pulse width Tp. Then, this routine returns to Step S21.

In Steps S21, S27 and S28, fuel control means is formed in order to receive an output from the intake pressure detecting means (intake pressure sensor) 56 and control the fuel supply means (injector) 42 so that the amount of the fuel supplied to the engine corresponds to the intake pressure.

Further, in Steps S24 to S26, correction means is formed in order to correct the amount of the fuel supplied from the fuel supply means (injector) 42 correspondingly to the operation of the first and second intake resistance changing means 40 and 44. Also in the variant, the control of the first and second intake resistance changing means 40 and 44 makes the output characteristics of the engine 10 be improved and the correction means makes the amount of the fuel supplied from the injector 42 be corrected correspondingly to the operation of the first and second intake resistance changing means 40 and 44. Consequently, when the resistance of the intake air flowing through the intake passageway 24 is changed, the relationship between the intake flow and the intake pressure is corrected so that the intake flow corresponds to the intake pressure. Consequently, the actual air fuel ratio can be prevented from being deviated from the desired one.

What is claimed is:

1. A fuel control apparatus of an engine comprising:
   fuel supply means for supplying fuel to the engine, said fuel supply means including a fuel injector,
   intake pressure detecting means for detecting an intake pressure of an intake passageway through which intake air is fed into the engine,
   fuel control means for controlling the fuel supply means so that an amount of the fuel supplied to the engine corresponds to the intake pressure on the basis of a signal outputted from the intake pressure detecting means,
   intake resistance changing means for changing a resistance of the intake air flowing through the intake passageway correspondingly to the operating condition of the engine, and
   correction means for correcting a supply amount of the fuel to be controlled by the fuel control means when the resistance of the intake air flowing through the intake passageway is changed by the intake resistance changing means,
   wherein the correction means makes the fuel control means add a correction injection pulse, which is obtained by multiplying a basic injection pulse width by a correction factor, to a basic injection pulse width of the fuel injector in order to increase an amount of the fuel supplied from the fuel injector,
   and wherein the correction factor is set so as to be increased when an absolute value of the intake pressure of the intake passageway is increased.

2. A fuel control apparatus of an engine according to claim 1, wherein the correction means corrects in such a manner that the amount of the fuel supplied from the fuel supply means is increased when the resistance of the intake air flowing through the intake passageway is reduced.

3. A fuel control apparatus of an engine according to claim 1, wherein the intake resistance changing means changes an area of the intake passageway.

4. A fuel control apparatus of an engine according to claim 1, wherein the intake resistance changing means changes a length of the intake passageway.

5. A fuel control apparatus of an engine according to claim 1, wherein the intake pressure detecting means is provided on the upstream side of the intake resistance changing means in the intake passageway.

6. A fuel control apparatus of an engine according to claim 1, wherein the fuel control means controls the fuel supply means in such a manner that the fuel is asynchronously supplied from the fuel supply means to the engine when the intake resistance changing means is operated so as to reduce the resistance of the intake air flowing through the intake passageway.

7. A fuel control apparatus of an engine according to claim 2, wherein the intake resistance changing means changes the area of the intake passageway.

8. A fuel control apparatus of an engine according to claim 2, wherein the intake resistance changing means changes the length of the intake passageway.

9. A fuel control apparatus of an engine according to claim 2, wherein the intake pressure detecting means is provided on the upstream side of the intake resistance changing means in the intake passageway.

10. A fuel control apparatus of an engine according to claim 2, wherein the fuel control means controls the fuel supply means so that the fuel is asynchronously supplied from the fuel supply means to the engine when the resistance of the intake air flowing through the intake passageway is reduced by the intake resistance changing means.

11. A fuel control apparatus of an engine according to claim 3, wherein the intake pressure detecting means is provided on the upstream side of the intake resistance changing means in the intake passageway.

12. A fuel control apparatus of an engine according to claim 4, wherein the intake pressure detecting means is provided on the upstream side of the intake resistance changing means in the intake passageway.

* * * * *